(12) United States Patent
Ishigaki et al.

(10) Patent No.: US 7,709,163 B2
(45) Date of Patent: May 4, 2010

(54) DISPLAY DEVICE AND MANUFACTURING METHOD THEREOF

(75) Inventors: Toshimasa Ishigaki, Chiba (JP); Fumio Takahashi, Mobara (JP); Yoshiaki Nakayoshi, Ooamishirasato (JP)

(73) Assignee: Hitachi Displays, Ltd., Mobara-shi (JP)

( * ) Notice: Subject to any disclaimer, the term of this patent is extended or adjusted under 35 U.S.C. 154(b) by 769 days.

(21) Appl. No.: 11/509,763

(22) Filed: Aug. 25, 2006

(65) Prior Publication Data
US 2007/0046868 A1  Mar. 1, 2007

(30) Foreign Application Priority Data
Aug. 26, 2005  (JP)  ............... 2005-245106

(51) Int. Cl.
*G02F 1/1335* (2006.01)
(52) U.S. Cl. ......................................... 430/7
(58) Field of Classification Search .................. None
See application file for complete search history.

(56) References Cited

U.S. PATENT DOCUMENTS

| | | | |
|---|---|---|---|
| 5,397,678 A | 3/1995 | Sato et al. | |
| 5,680,187 A | 10/1997 | Nagayama et al. | |
| 6,630,274 B1 | 10/2003 | Kiguchi et al. | |
| 6,909,485 B2 | 6/2005 | Yoon et al. | |
| 2003/0113639 A1* | 6/2003 | Kawase | 430/7 |
| 2003/0162107 A1* | 8/2003 | Sato | 430/7 |
| 2003/0179327 A1* | 9/2003 | Nonaka et al. | 349/106 |
| 2003/0224255 A1* | 12/2003 | Fujimori | 430/7 |
| 2005/0036086 A1* | 2/2005 | Kim et al. | 349/106 |

FOREIGN PATENT DOCUMENTS

| | | |
|---|---|---|
| CN | 1119743 | 4/1996 |
| CN | 1482501 | 3/2003 |
| JP | 05-173320 | 7/1993 |
| JP | 2000-221319 | 8/2000 |
| JP | 2003-294930 | 10/2003 |

\* cited by examiner

*Primary Examiner*—John A. McPherson
(74) *Attorney, Agent, or Firm*—Antonelli, Terry, Stout & Kraus, LLP.

(57) ABSTRACT

The present invention facilitates a control of a temperature of white color and color tones of respective colors of a color liquid crystal display device. To achieve such an aim, a display device of the present invention includes a display panel which arranges a plurality of color filters which differ in color for each pixel, and at least the color filter of one color is formed of a plurality of filter layers stacked on a transparent substrate.

7 Claims, 9 Drawing Sheets

DISPLAY DEVICE AND MANUFACTURING METHOD THEREOF

CROSS-REFERENCE TO RELATED APPLICATIONS

The disclosure of Japanese Patent Application No. 2005-245106 filed on Aug. 26, 2005 including the specification, drawings and abstract is incorporated herein by reference in its entirety.

BACKGROUND OF THE INVENTION

1. Field of the Invention

The present invention relates to a display device and a manufacturing method thereof, and more particularly to a technique which is effectively applicable to a color liquid crystal display device.

2. Description of the Related Arts

As one of display devices, there exists a color liquid crystal display device which includes a liquid crystal display panel capable of performing a color display. The color liquid crystal display device is a display device which is capable of performing a high-definition color display and, recently, has been popularly used as a liquid crystal display panel for a liquid crystal television receiver set or a PC (Personal Computer), a display for a PDA (Personal Digital Assistant), a mobile phone or the like.

The liquid crystal display panel which is used in the color liquid crystal display device (hereinafter referred to as color liquid crystal display panel) is, for example, a display panel which is constituted by sealing a liquid crystal material between a first substrate (a TFT substrate) which arranges TFT (Thin Film Transistor) elements and pixel electrodes in an array and a second substrate (a color filter substrate) which arranges color filters of R (red), G (green) and B (blue) at positions corresponding to the pixel electrodes. Here, in the color liquid crystal display panel, a display pixel of one dot is constituted of a set which is formed of a R pixel having the red color filter, a G pixel having the green color filter, and a B pixel having the blue color filter.

In manufacturing the color filter substrate, for example, first of all, a black matrix which separates the R pixels, the G pixels and the B pixels on a transparent substrate formed of a glass substrate or the like is formed. Then, the red color filter for the R pixel, the green color filter for the G pixel and the blue color filter for the B pixel are sequentially formed on the transparent substrate.

In forming the color filters, a method which performs patterning of a resist in which pigment is dispersed using a photolithography method is most popularly adopted. In this method, for example, first of all, a negative resist in which pigment is dispersed is applied to a whole surface of the transparent substrate by coating, a solvent is removed by evaporation from the resist by heating so as to dry the resist. Next, the negative resist is exposed through a photo mask which blocks light except for predetermined pixel regions. After exposure, the resist in the pixel region is cured by light and is made insoluble against a developer. Accordingly, in developing the resist using alkaline solution, only regions except for the pixel regions are developed and removed whereby a pixel pattern of the color filter is obtained. Such steps are repeatedly performed with respect to the red, green and blue color filters.

Further, there also exists a method which uses a dry film resist in place of such a coating-type resist (for example, see Japanese Patent Laid-open Hei5-173320 (document 1)). In this method, a film-like negative resist in which pigment is dispersed is adhered to a transparent substrate by thermocompression bonding and, thereafter, the above-mentioned exposure and development are performed thus forming a pixel pattern of a color filter. This method can simplify the step for forming the resist on the transparent substrate compared to the method which coats the resist. Further, by preliminarily forming an oxygen interrupting layer on the resist of the transfer film, a curing action is accelerated thus increasing the sensitivity of the resist. On the other hand, however, the method has demerits or drawbacks such as a high material cost, and no flexibility in a delicate control of color tones by changing coated film thicknesses.

Further, recently, aiming at the reduction of a material cost and a manufacturing cost, a method which forms a pattern by supplying pigment-dispersed ink to only pixel portions such as high accuracy printing (for example, described in Japanese Laid-open No. 294930/2003 (patent document 2) and ink jet printing (for example, described in Japanese Laid-open No. 221319/2000 (patent document 3).

Corresponding to a usage or an application to which the color liquid crystal display device is applied, a demand for, for example, a temperature of white color obtained by synthesizing lights which pass through the R pixel, the G pixel and the B pixel, the color reproducibility of respective colors and the like differs. Accordingly, in manufacturing the color filter substrate, it is necessary to control color tones of filter materials used for color filters of respective pixels by taking, for example, the color temperature of white color and the color reproducibility of respective colors into consideration.

As one of methods of controlling the temperature of white color and color reproducibility of respective colors, there exists a method which changes a film thickness of the pigment-dispersed resist. However, when the film thickness is largely changed, there arises a drawback such as irregularities in coating thickness and hence, only the color-tone change at a level of fine adjustment is possible. Accordingly, when the film thickness adjustment cannot cope with the required temperature of white color or the color reproducibility of respective colors, there arises a drawback that it is necessary to prepare a new pigment-dispersed resist in which the color tone is adjusted by changing a kind of pigment and a blending ratio of pigment. Further, each time the color filter substrate which differs in the temperature of white color and the color reproducibility of respective colors is manufactured, a changeover operation of the pigment-dispersed resist becomes necessary and hence, there arises a drawback that the production efficiency is lowered. Here, these drawbacks are drawbacks which are also shared in common by pigment-dispersed ink used in the above-mentioned high-definition printing and ink jet printing.

Further, as a method for controlling the temperature of white color and the color reproducibility of respective colors, for example, there has been also known a method which changes the numerical apertures of the respective pixels consisting of the R pixel, the G pixel and the B pixel, for example. However, in adopting this method, for example, it is necessary to change a pattern of an exposure mask corresponding to numerical apertures of the respective pixels or it is necessary to change sizes of the pixel electrodes on the TFT substrate. Accordingly, there has been a drawback that it is necessary to individually prepare the above-mentioned CF substrate and the TFT substrate corresponding to the required temperature of white color and color reproducibility of the respective colors.

It is an object of the present invention to provide a technique which facilitates a control of a temperature of white color and color tones of respective colors in a color liquid crystal display device, for example.

It is another object of the present invention to provide a technique which can easily form color filters of arbitrary color tones using a same filter material.

The above-mentioned object, other objects and novel features of the present invention will become apparent from the description of this specification and attached drawings.

SUMMARY OF THE INVENTION

To schematically explain the invention disclosed in the present invention, it is as follows.

(1) In a display device including a display panel on which a plurality of color filters different in color from each other are arranged for each pixel, at least the color filter of one color is formed of a plurality of filter layers stacked on a transparent substrate.

(2) In the display device having the above-mentioned constitution (1), the plurality of stacked filter layers are configured such that an area of the first filter layer close to the transparent substrate is set larger than an area of the second filter layer remoter from the transparent substrate than the first filter layer.

(3) In the display device having the above-mentioned constitution (2), the second filter layer is arranged on a plurality of regions of the first filter layer in an island-like array.

(4) In the display device having any one of the above-mentioned constitutions (1) to (3), the plurality of stacked filter layers have the same color tone.

(5) In the display device having any one of the above-mentioned constitutions (1) to (3), at least one filter layer out of the plurality of the stacked filter layers differs from other filter layers in color tones.

(6) In the display device having any one of the above-mentioned constitutions (1) to (3), the filter layer which is remotest from the transparent substrate out of the plurality of stacked filter layers has color thereof deeper than colors of other filter layers.

(7) In the display device having any one of the above-mentioned constitutions (1) to (6), the display device is a liquid crystal display device.

(8) In a manufacturing method of a display device including a step of forming color filters on a transparent substrate, the manufacturing method includes a first step of stacking a plurality of photosensitive filter layers on the transparent substrate, a second step of exposing the stacked photosensitive filter layers, and a third step of developing the exposed photosensitive filter layers, wherein in the first step, the photosensitive filter layers which differ in exposure sensitivity are stacked in order that the exposure sensitivity is decreased as the photosensitive filter layer is arranged remoter from the transparent substrate and, in the second step, a first region of the stacked photosensitive filter layer is exposed and, thereafter, a portion of or the whole first region is continuously exposed.

(9) In the manufacturing method of the display device having the above-mentioned constitution (8), the respective photosensitive filter layers are formed of a negative-type photosensitive filter, wherein in the second step, the exposure is performed until the first region of at least the photosensitive filter layer closest to the transparent substrate is made insoluble to a developer and, thereafter, the portion of or the whole first region is continuously exposed.

(10) In the manufacturing method of the display device having the above-mentioned constitution (9), in the second step, the portion or the whole first region is exposed only for a preset time and, thereafter, the first region is continuously exposed.

(11) In the manufacturing method of the display device having the above-mentioned constitution (9), in the second step, a first region is exposed with a preset light quantity and, thereafter, the portion or the whole first region is continuously exposed while increasing the light quantity.

(12) In the manufacturing method of the display device having the above-mentioned constitution (9), in the second step, the collective exposure is performed by changing exposure quantities for respective regions such that the first region is collectively exposed with an exposure quantity which makes the first photosensitive filter layer close to the transparent substrate insoluble to a developer, and the portion or the whole first region is collectively exposed with an exposure quantity which makes the second photosensitive filter layer insoluble to a developer.

(13) In the manufacturing method of the display device having anyone of the above-mentioned constitutions (8) to (12), in the first step, a transfer film which sequentially stacks photosensitive filter layers on a base film in order from the photosensitive layer having low exposure sensitivity is used, and the photosensitive filter layer which is remotest from the base film is adhered to the transparent substrate, and the stacked photosensitive filter layers are transferred.

The display device of the present invention is, as described in conjunction with the above-mentioned constitution (1), configured such that the color filter of one color is formed of the plurality of stacked filter layers. In such a display device, for example, as in the case of the above-mentioned constitution (2) or (3), it is possible to partially form the second filter layer on the first filter layer close to the transparent substrate. Due to such a constitution, when the filter layers are formed of two layers, for example, there exists a region where only the first filter layer is provided and the region where the first filter layer and the second filter layer are overlapped to each other. Here, the region where the first filter layer and the second filter layer are overlapped to each other exhibits a deeper color than the color of the region where only the first filter layer is provided. Accordingly, by merely changing the area of the second filter layer, it is possible to easily control the color tones of the color filters.

Here, with respect to the stacked filter layers, the filter layers having the same color tone may be stacked as in the case of the above-mentioned constitution (4) or the filter layers which differ in color tone may be stacked as in the case of the above-mentioned constitution (5). Further, in stacking the filter layers which differ in color tone (color density), for example, by adopting the above-mentioned constitution (6), it is possible to widen a range of the color tones which can be controlled or reproduced.

Further, it is preferable to apply the above-mentioned constitutions (1) to (6) to the liquid crystal display panel as described in case of the above-mentioned constitution (7), for example.

Further, in manufacturing the display device having the above-mentioned constitutions (1) to (6), for example, it is preferable to form the above-mentioned color filter using the method having the above-mentioned constitution (8) and (9). By forming the color filter using such a method, it is possible to form the color filter having the arbitrary color tone by combining photosensitive filter layers of one kind. Accordingly, compared to the conventional color filter forming method, it is possible to easily form the color filter having the arbitrary color tone.

Further, in forming the above-mentioned color filter using the method having the above-mentioned constitution (8), for example, the exposure time may be controlled as in the case of the above-mentioned constitution (9) or (10) or the exposure quantity may be controlled as in the case of the above-mentioned constitution (11) or (12).

Further, in forming the color filter using the method having any one of the above-mentioned methods (8) to (12), for example, by transferring the photosensitive filter layers to the transparent substrate using the above-mentioned transfer film in the above-mentioned constitution (13), it is possible to easily form the photosensitive filter layer.

DETAILED DESCRIPTION OF THE INVENTION

Hereinafter, the present invention is explained in detail in conjunction with embodiments by reference to drawings. Here, in all drawings for explaining the embodiments, parts having identical functions are indicated by same symbols and their repeated explanation is omitted.

In a display device of the present invention, a color filter of one color is formed by stacking a plurality of filter layers and a color tone of the color filter is controlled by changing an area of a second filter layer stacked on a first filter layer.

Embodiment

Figure 1:
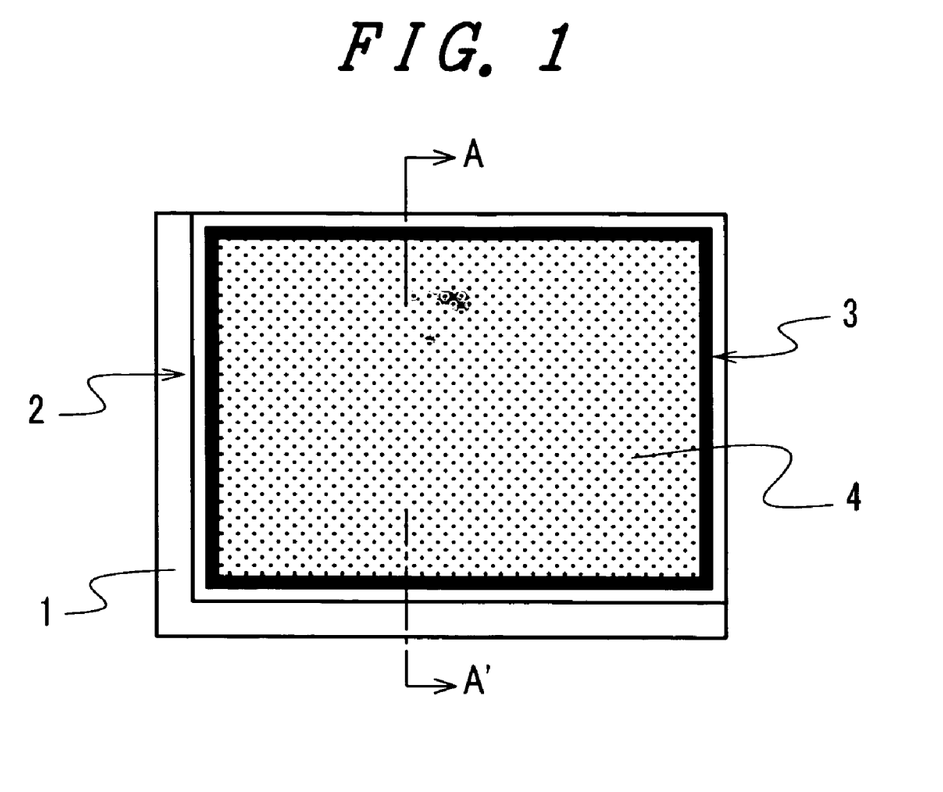
FIG. 1 is a schematic view for explaining the schematic constitution of a display device of the first embodiment according to the present invention and also is a schematic plan view showing the schematic constitution of a liquid crystal display panel.
Figure 2:
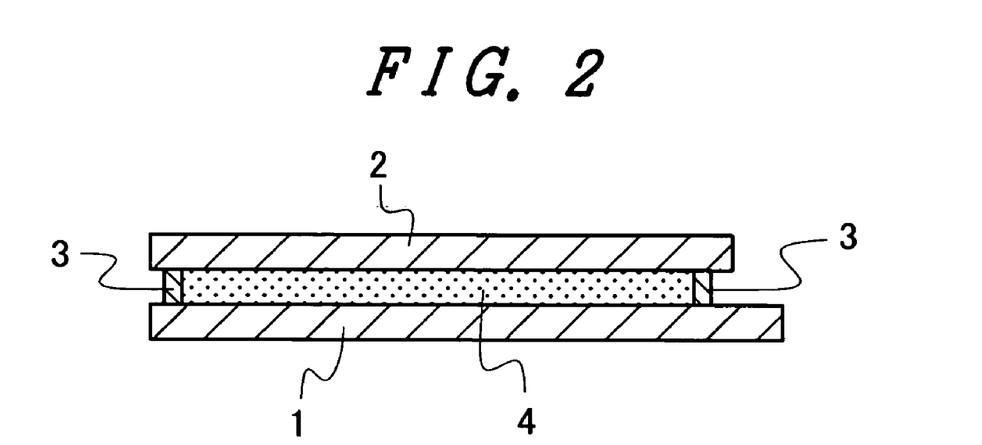
FIG. 2 is a schematic view for explaining the schematic constitution of a display device of the first embodiment according to the present invention and also is a cross-sectional view taken along a line A-A' in FIG. 1.
Figure 3:
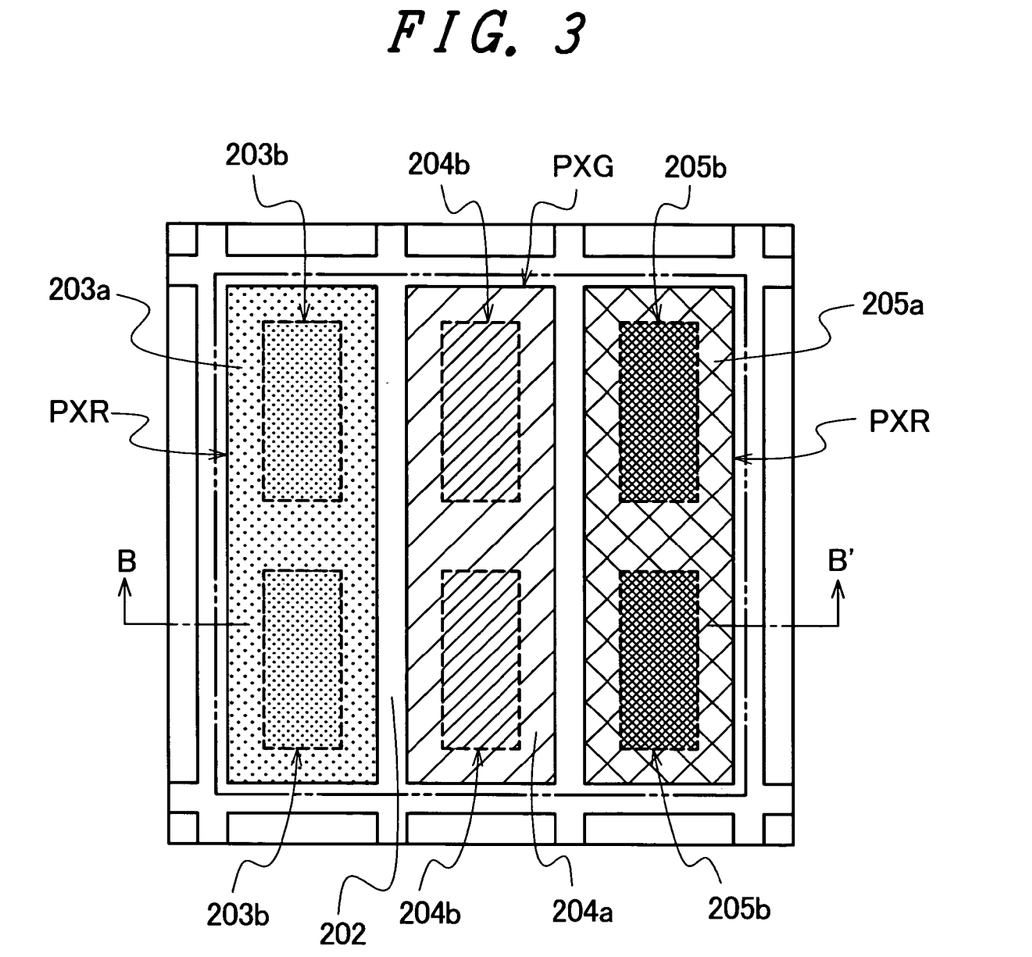
FIG. 3 is a schematic view for explaining the schematic constitution of a display device of the first embodiment according to the present invention and also is a schematic plan view showing the constitution of one dot of the liquid crystal display panel.
Figure 4:
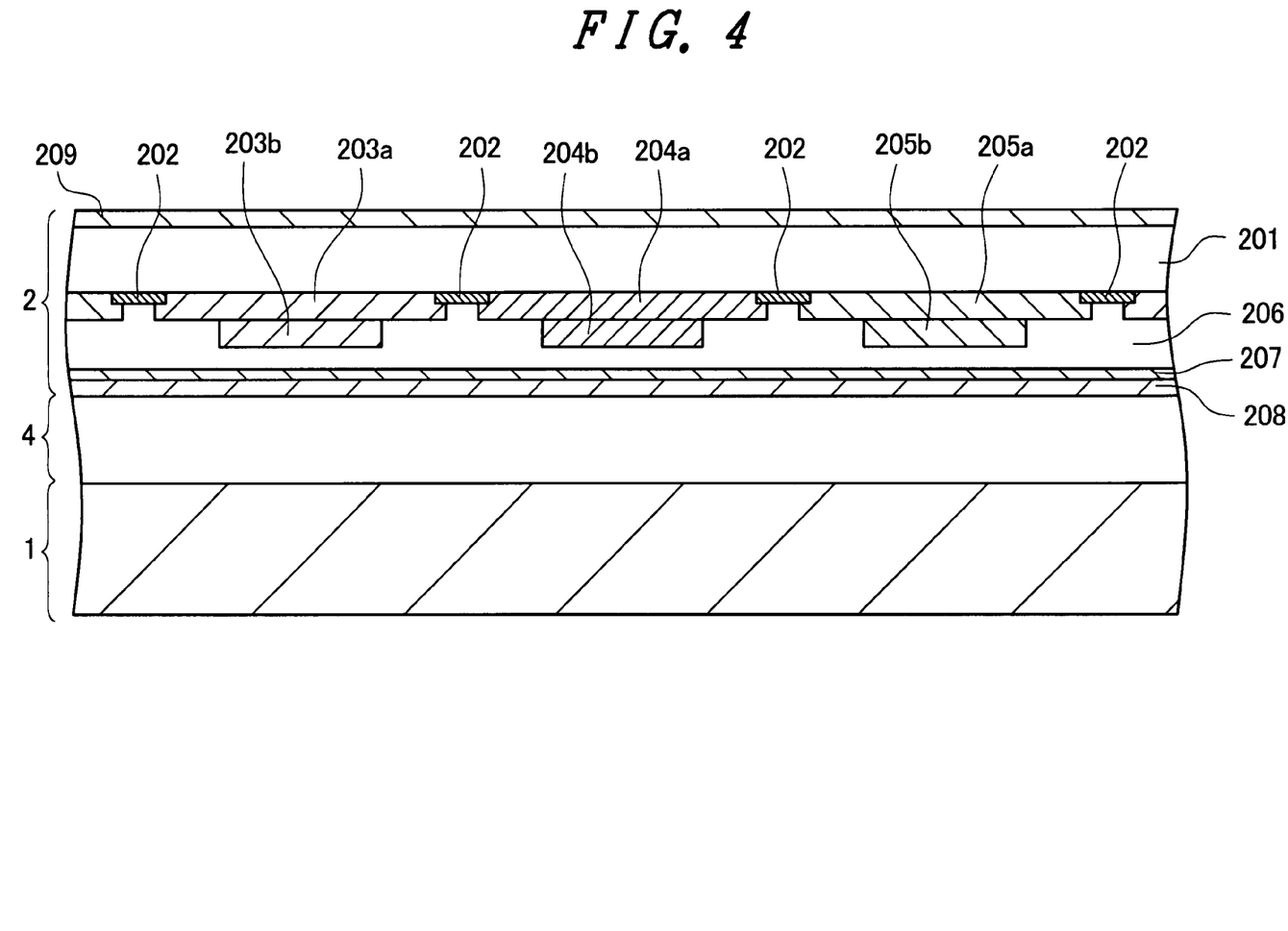
FIG. 4 is a schematic view for explaining the schematic constitution of a display device of the first embodiment according to the present invention and also is a cross-sectional view taken along a line B-B' in FIG. 3.

FIG. 1 to FIG. 4 are schematic views for explaining the schematic constitution of a display device of the first embodiment according to the present invention, wherein FIG. 1 is a schematic plan view showing the schematic constitution of a liquid crystal display panel, FIG. 2 is a cross-sectional view taken along a line A-A' in FIG. 1, FIG. 3 is a schematic plan view showing the constitution of one dot of the liquid crystal display panel, and FIG. 4 is a cross-sectional view taken along a line B-B' in FIG. 3.

In FIG. 1 and FIG. 2, numeral 1 indicates a first substrate (a TFT substrate), numeral 2 indicates a second substrate (a color filter substrate), numeral 3 indicates a sealing material, and numeral 4 indicates a liquid crystal material. Further, in FIG. 3 and FIG. 4, numeral 201 indicates a glass substrate, numeral 202 indicates a black matrix, numerals 203a and 203b respectively indicate a first filter layer and a second filter layer of a red color filter, numerals 204a and 204b respectively indicate a first filter layer and a second filter layer of a green color filter, numerals 205a and 205b respectively indicate a first filter layer and a second filter layer of a blue color filter, numeral 206 indicates an overcoat layer, numeral 207 indicates a common electrode, numeral 208 indicates orientation film and numeral 209 indicates a polarizer.

In this embodiment, a color liquid crystal display device which includes a liquid crystal display panel capable of performing a color display is taken as an example of the display device to which the present invention is applied, and the constitution as well as the manner of operation and advantageous effects of the color liquid crystal display device are explained.

The color liquid crystal display device is, for example, as shown in FIG. 1 and FIG. 2, configured such that a first substrate 1 and a second substrate 2 are adhered to each other using an annular sealing material 3, and a liquid crystal material 4 is sealed in a space surrounded by the first substrate 1, the second substrate 2 and the sealing material 3 thus constituting a liquid crystal display panel.

In the liquid crystal display panel, the first substrate 1 is, for example, a TFT substrate on which TFT elements and pixel electrodes are arranged in an array in a state that the TFT element and the pixel electrode are provided for each pixel. In the liquid crystal display panel of this embodiment, the TFT substrate 1 has the same constitution as a conventional liquid crystal display panel and hence, the detailed explanation of the constitution of the TFT substrate 1 is omitted. Further, the second substrate 2 is a color filter substrate which arranges color filters at positions where the color filters face the pixel electrodes of the TFT substrate 1.

Further, one dot of the liquid crystal display panel is a display panel capable of performing a color display based on three primary colors of RGB, for example. That is, one dot of the liquid crystal display panel is constituted of a display panel which is one set of an R pixel on which the color filter of R (red) is arranged, a G pixel on which the color filter of G (green) is arranged, and a B pixel on which the color filter of B (blue) is arranged.

In the liquid crystal display panel of this embodiment, the color filter substrate 2 is, for example, as shown in FIG. 3 and FIG. 4, configured such that on a surface of a glass substrate 201 which faces the TFT substrate 1 in an opposed manner, a black matrix 202 which separates the respective display pixels and also separates a R pixel PXR, a G pixel PXG and a B pixel PXB within the display pixel is formed. Further, in a region which is separated by the black matrix 202, red color filters 203a, 203b, green filter layers 204a, 204b and blue color filters 205a, 205b are arranged. Here, with respect to the red color filters 203a, 203b, for example, as shown in FIG. 3 and FIG. 4, the second filter 203b is partially stacked on the first filter layer 203a which is formed on the glass substrate 201. Further, also with respect to the green color filters 204a, 204b, for example, as shown in FIG. 3 and FIG. 4, the second filter 204b is partially stacked on the first filter layer 204a which is formed on the glass substrate 201. Further, also with respect to the blue color filters 205a, 205b, for example, as shown in FIG. 3 and FIG. 4, the second filter layer 205b is partially stacked on the first filter layer 205a which is formed on the glass substrate 201.

Further, an overcoat layer 206 is formed over the respective color filters, and a common electrode 207 and an orientation film 208 are formed on a surface of the overcoat layer 206. Further, on a back surface of the glass substrate 201 opposite to the surface on which the color filters are formed, for example, a polarizer 209 is adhered. Here, the common electrode 207 may be, for example, arranged between the glass substrate 201 and the polarizer 209. Further, the common electrode 207 may be formed on the TFT substrate 1 side, for example. Further, although not shown in the drawing, the polarizer 209 makes a pair with a polarizer which is formed on a TFT substrate 1 side, wherein the polarizer 209 is adhered such that the cross-nicol relationship or the parallel-nicol relationship is established between the polarizer 209 and the polarizer formed on the TFT substrate 1 side.

In the color filter substrate 2 which is used in the liquid crystal display panel of this embodiment, in the R pixel PXR in which the red color filter is arranged, two island-like second filters 203b are stacked on the first filter 203a. Here, when both of the first filter layer 203a and the second filter layer 203b are formed of a red filter, the density of color differs between a region which is constituted of only the first filter layer 203a and a region where the second filter layer 203b is stacked on the first filter layer 203a. Accordingly, it is possible to obtain a color tone between the color tone when the whole pixel is formed of only the first filter layer 203a and the color tone when the whole R pixel PXR is formed by stacking the second filter layer 203b on the first filter layer 203a. Further, also with respect to the G pixel PXG in which the green color filter is arranged, it is possible to obtain a color tone between the color tone when the whole pixel is formed of only the first filter layer 204a and the color tone when the whole G pixel PXG is formed by stacking the second filter layer 204b on the first filter layer 204a. Further, also with respect to the B pixel PXB in which the blue color filter is arranged, it is possible to obtain a color tone between the color tone when the whole pixel is formed of only the first filter layer 205a and the color tone when the whole B pixel PXB is formed by stacking the second filter layer 205b on the first filter layer 205a.

Figure 5:
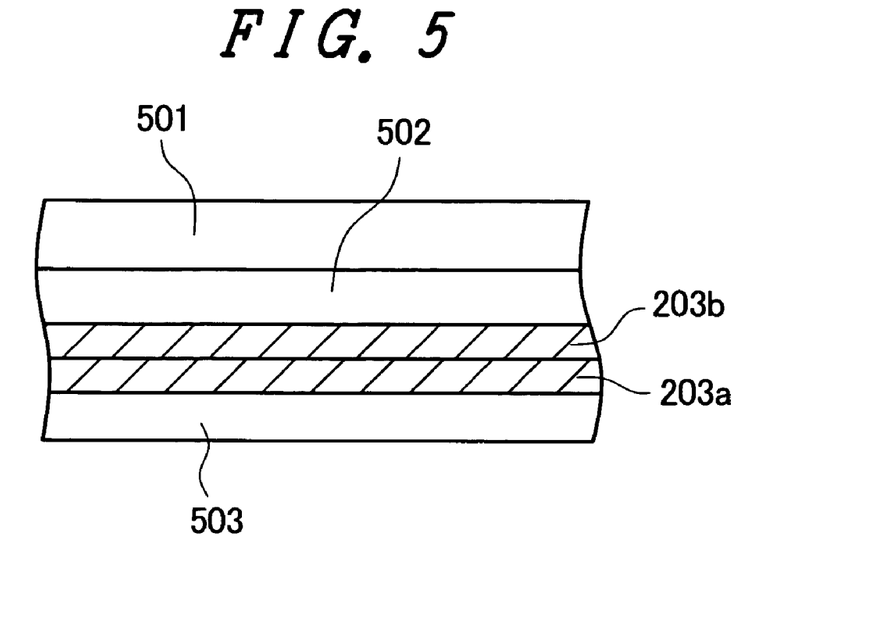
FIG. 5 is a schematic view for explaining a manufacturing method of a color filter substrate of a liquid crystal display panel of this embodiment and also is a schematic cross-sectional view showing a constitutional example of a transfer film used in the formation of a red color filter.
Figure 6:
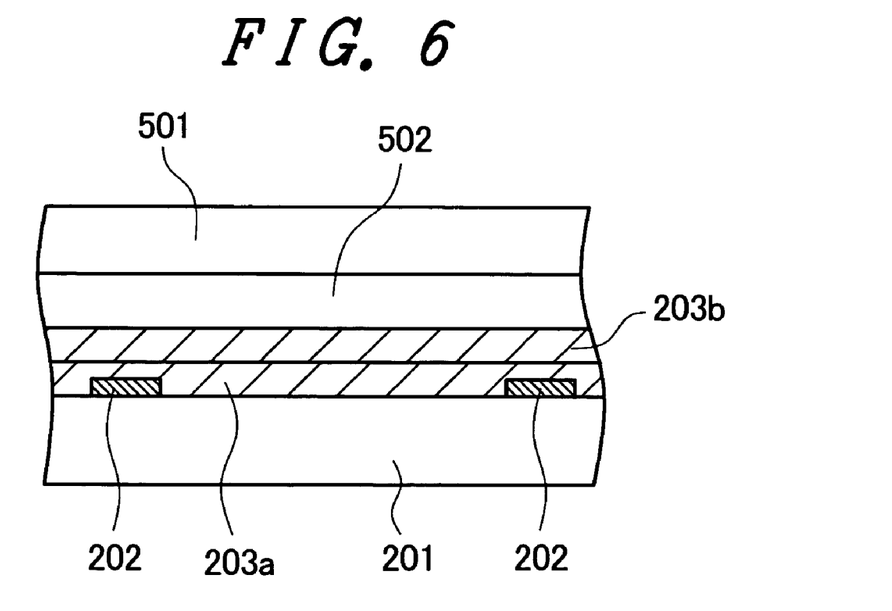
FIG. 6 is a schematic view for explaining a manufacturing method of a color filter substrate of a liquid crystal display panel of this embodiment and also is a schematic cross-sectional view for explaining a step of transferring two-layered filter layer to a transparent substrate.
Figure 7:
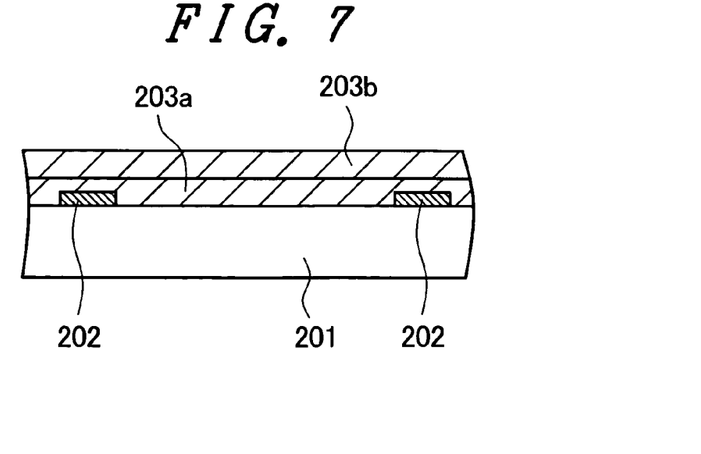
FIG. 7 is a schematic view for explaining a manufacturing method of a color filter substrate of a liquid crystal display panel of this embodiment and also is a schematic cross-sectional view for explaining a step of transferring two-layered filter layer to a transparent substrate.
Figure 8:
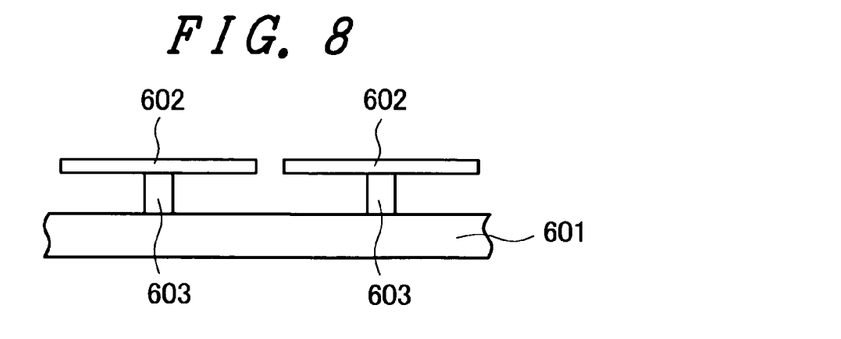
FIG. 8 is a schematic view for explaining a manufacturing method of a color filter substrate of a liquid crystal display panel of this embodiment and also is a schematic view showing a constitutional example of an exposure device.
Figure 9:
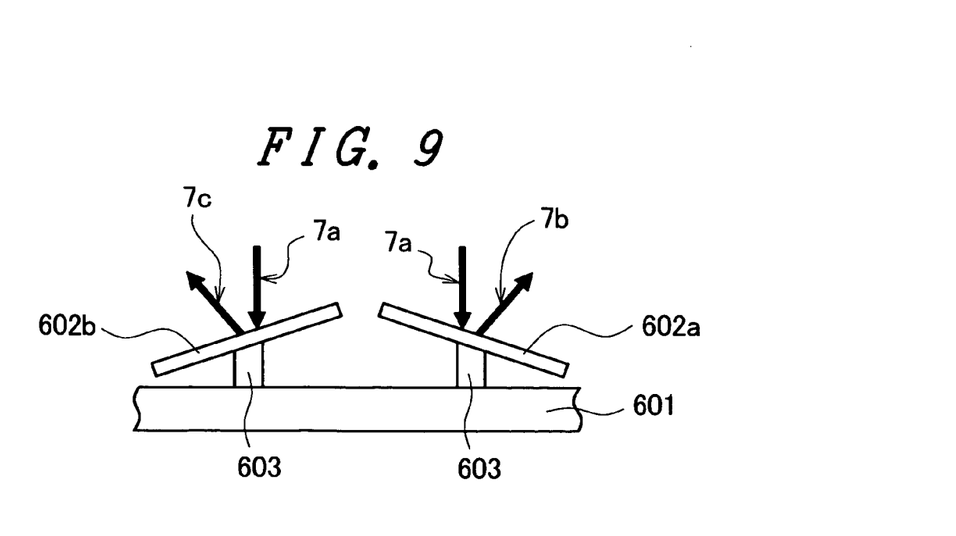
FIG. 9 is a schematic view for explaining a manufacturing method of a color filter substrate of a liquid crystal display panel of this embodiment and also is a schematic view for explaining an exposure principle of the exposure device shown in FIG. 8.
Figure 10:
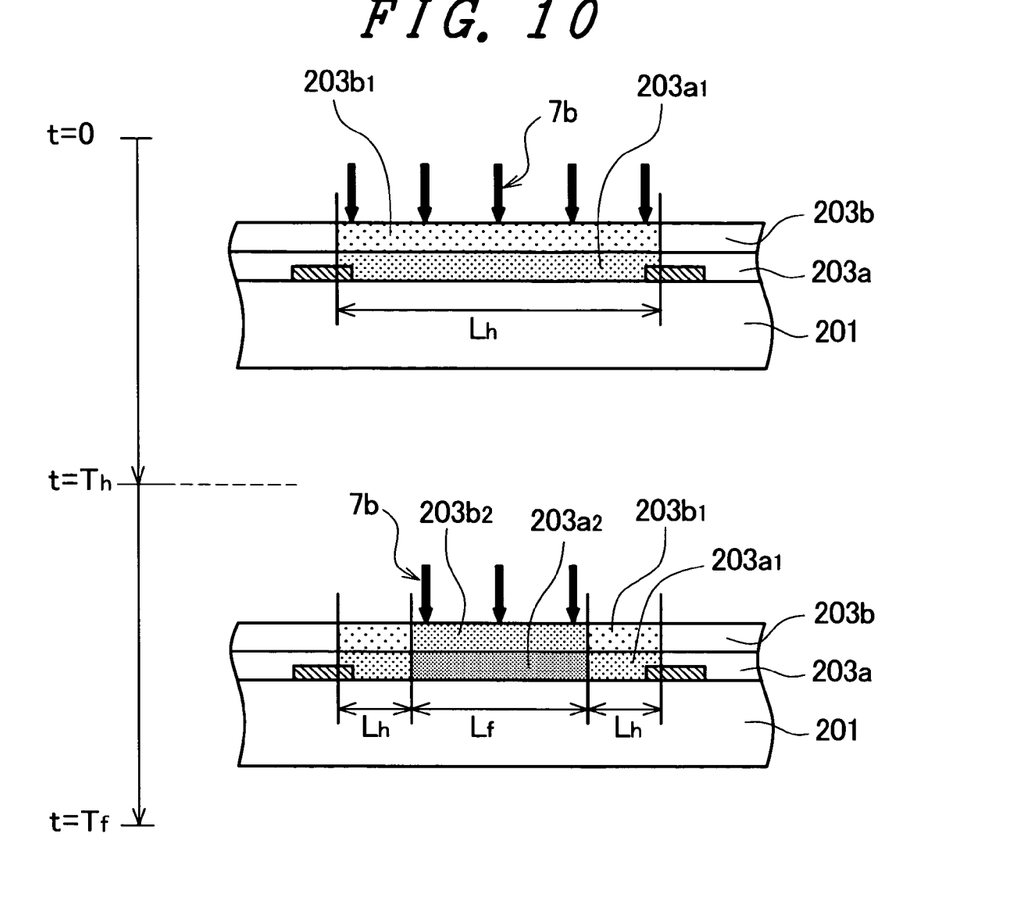
FIG. 10 is a schematic view for explaining a manufacturing method of a color filter substrate of a liquid crystal display panel of this embodiment and also is a schematic cross-sectional view showing an exposure method.
Figure 11:
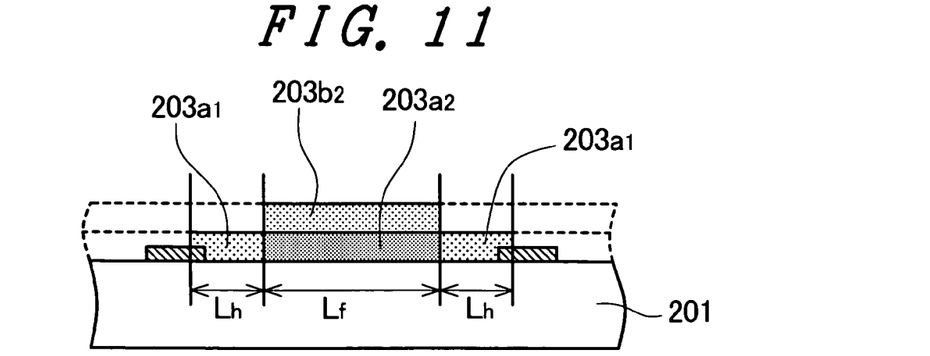
FIG. 11 is a schematic view for explaining a manufacturing method of a color filter substrate of a liquid crystal display panel of this embodiment and also is a schematic cross-sectional view showing a state after development.

FIG. 5 to FIG. 11 are schematic views for explaining a manufacturing method of a color filter substrate of a liquid crystal display panel of this embodiment, wherein FIG. 5 is a schematic cross-sectional view showing a constitutional example of a transfer film used in the formation of a red color filter, FIG. 6 and FIG. 7 are schematic cross-sectional views for explaining a step of transferring two-layered filter layer to a transparent substrate, FIG. 8 is a schematic view showing a constitutional example of an exposure device, FIG. 9 is a schematic view for explaining an exposure principle of the exposure device shown in FIG. 8, FIG. 10 is a schematic cross-sectional view for explaining an exposure method, and FIG. 11 is a schematic cross-sectional view showing a state after development.

In manufacturing the color filter substrate 2 used in the liquid crystal display panel of this embodiment, for example, first of all, the black matrix 202 is formed on the surface of the transparent substrate such as the glass substrate 201. The black matrix 202 is formed using a resist in which black pigment, for example, is dispersed by patterning using a photolithography method. Further, in place of using the resist, the black matrix 202 may be formed by forming a metal chromium on the surface of the glass substrate 201 by a sputtering method and, thereafter, by etching the metal chromium film.

Next, for example, the red color filter is formed in the region of the R pixel PXR on the glass substrate 201. In forming the red color filter, for example, as shown in FIG. 5, a transfer film which sequentially stacks the second filter layer 203b, the first filter layer 203a and a cover film 503 on a surface of a base film 501 with a cushion material 502 interposed between the base film 501 and the second filter layer 203b is used. Here, the first filter layer 203a and the second filter layer 203b are formed of a negative photosensitive film, for example. Further, the exposure sensitivity of the second filter layer 203b is set lower than the exposure sensitivity of the first filter layer 203a.

In forming the red color filter using the transfer film shown in FIG. 5, the cover film 503 of the transfer film is peeled off and, as shown in FIG. 6, the exposed first filter layer 203a is adhered to the glass substrate 201. This adhesion is performed by a roll lamination method, for example. For example, the first filter layer 203a is adhered to the glass substrate 201 by thermal compression bonding at a roll temperature of 125° C., a roll pressure of 6 kg/cm$^2$ and a lamination speed of 500 mm/min, for example.

Next, by peeling off the base film 501 and the cushion material 502 of the transfer film, as shown in FIG. 7, it is possible to obtain a state in which the first filter layer 203a and the second filter layer 203b are stacked on the whole surface of the glass substrate 201. Due to such operations, it is possible to form the filter layer which is constituted of a plurality of layers (two layers) on the glass substrate 201 in one step.

Next, the first filter layer 203a and the second filter layer 203b are subjected to exposure. Here, the exposure of each filter layer is, for example, performed using a direct drawing exposure machine (see Japanese Patent Laid-open 2004-6440, for example). The direct drawing exposure machine is, for example, as shown in FIG. 8, an exposure machine having DMD mirrors which arranges a plurality of fine mirrors 602 on a support plate 601. Here, although only two fine mirrors 602 are shown in FIG. 8, in an actual machine, a large number of fine mirrors are arranged in a matrix array.

Here, each fine mirror 602 is a movable mirror which is supported on the support plate 601 by way of a direction control portion 603. Each fine mirror 602 has, for example, the direction thereof changed in two directions as shown in FIG. 9. Here, for example, assume that when the first mirror 602*a* is directed as shown in FIG. 9 so as to reflect light 7*a* from a light source on the first mirror 602*a*, a reflection light 7*b* is radiated to the glass substrate 201. Here, also assume that, for example, when the second mirror 602*b* is directed as shown in FIG. 9, when the light 7*a* from the light source is reflected on the second mirror 602*b*, the reflection light 7*c* is absorbed by a light absorption layer. With use of such DMD mirrors, by controlling the directions of the respective fine mirrors 602, it is possible to control a light radiation region (an exposure region) on the glass substrate 201 can be controlled.

In performing the exposure of the first filter layer 203*a* and the second filter layer 203*b* using the direct drawing exposure machine, as shown in FIG. 10, first of all, the primary exposure is applied to a whole region $L_h$ of the R pixel PXR which is separated by the black matrix 202 for a preset time, for example $t=T_h$ (second). This exposure time $t=T_h$ (second) is set to time during which a curing action of an exposure region $203a_1$ of the first filter layer 203*a* which exhibits the high exposure sensitivity progresses until the exposure region $203a_1$ becomes insoluble to a developer and a curing action of the exposure region $203b_1$ of the second filter layer 203*b* which exhibits the low exposure sensitivity is stopped at a stage that the exposure region $203b_1$ is dissolved by the developer. Hereinafter, the whole region $L_h$ of the R pixel PXR to which the primary exposure is applied is referred to as a half-tone exposure region.

Then, the primary exposure is performed for $T_h$ seconds and, subsequently, the primary exposure is applied only to the preset region $L_f$ out of the half tone exposure region $L_h$ until $t=T_f$ (second), for example. This exposure time $t=T_f$ (second) is time during which the exposure region $203b_2$ of the second filter layer 203*b* which exhibits the low exposure sensitivity becomes insoluble to the developer. Hereinafter, the region $L_f$ of the R pixel PXR to which the secondary exposure is applied is referred to as a full-tone exposure region. Here, it is needless to say that when the exposure is performed until the exposure time $t=T_f$ (second), the curing action of an exposure region $203a_2$ of the first filter layer 203*a* which exhibits the high exposure sensitivity progresses until the exposure region $203a_2$ becomes insoluble to the developer.

By performing the primary exposure and the secondary exposure to the first filter layer 203*a* and the second filter layer 203*b*, as shown in FIG. 10, the dissolution characteristics of the respective regions consisting of the unexposed region, the half-tone exposure region $L_h$ and the full-tone exposure region $L_f$ of the first filter layer (first color filter layer) 203*a* and the second filter layer (second color filter layer) 203*b* with respect to the developer are expressed as shown in a following Table 1. Table 1 shows the disillusion characteristics of the respective color filter layers with respect to the developer.

TABLE 1

|  | Unexposed region | Half-tone exposure region $L_h$ | Full-tone exposure region $L_f$ |
| --- | --- | --- | --- |
| Second CF layer | Soluble | Soluble (dissolution speed being slightly lowered) | Insoluble (or hardly soluble) |
| First CF layer | Soluble | Insoluble (or hardly soluble) | Insoluble (or hardly soluble) |

That is, by developing the first filter layer 203*a* and the second filter layer 203*b* after performing the primary exposure and the secondary exposure as shown in FIG. 10, as shown in FIG. 11, the full-tone exposure region $L_f$ remains on both of a first filter layer $203a_2$ and the second filter layer $203b_2$, while the half-tone exposure region $L_h$ remains only in the first filter layer $203a_1$. Accordingly, by changing an area ratio between the half-tone exposure region $L_h$ and the full-tone exposure region $L_f$, it is possible to easily control the remaining area of the second filter layer 203*b* on the first filter layer 203*a*. As a result, it is possible to easily form the red color filter having the color tone which falls between the color tone when only the first filter layer 203*a* exists and when the whole filter layer is formed of the first filter layer 203*a* and when the second filter layer 203*b* remains in the filter layer as a whole.

Further, the exposure is not limited to the steps shown in FIG. 10 and, for example, by applying the primary exposure only to the full-tone exposure region $L_f$ for a preset time $t=T_f$ (second) and, thereafter, by applying the secondary exposure to the half-tone exposure region $L_h$ for $t=T_h$ (second), it is possible to form a filter layer shown in FIG. 11.

Further, in case of the direct drawing exposure machine, time in which the fine mirrors 602 direct light to an object to be exposed (filter layer) corresponds to the exposure time. Accordingly, by controlling the time in which the fine mirrors 602 direct light to the filter layer, it is not always necessary to perform exposure by dividing the exposure to the primary exposure and the secondary exposure, and the required color filter layer may be formed by performing the exposure operation one time. For example, by controlling the time in which mirrors which expose the full-tone exposure region $L_f$ direct light to the filter layer to $t=T_h+T_f$ (second) and the time in which mirrors which expose the half-tone exposure region $L_h$ direct light to the filter layer $t=T_h$ (second), it is possible to form the filter layer shown in FIG. 11.

Further, although the repeated explanation is omitted, also in forming the green color filter and the blur color filter, it is possible to easily form color filters having the color tone between the color tone when the whole filter layer is formed of only the first filter layer and when the second filter layer remains in the whole filter layer by forming the color filter using the substantially equal steps.

Figure 12:
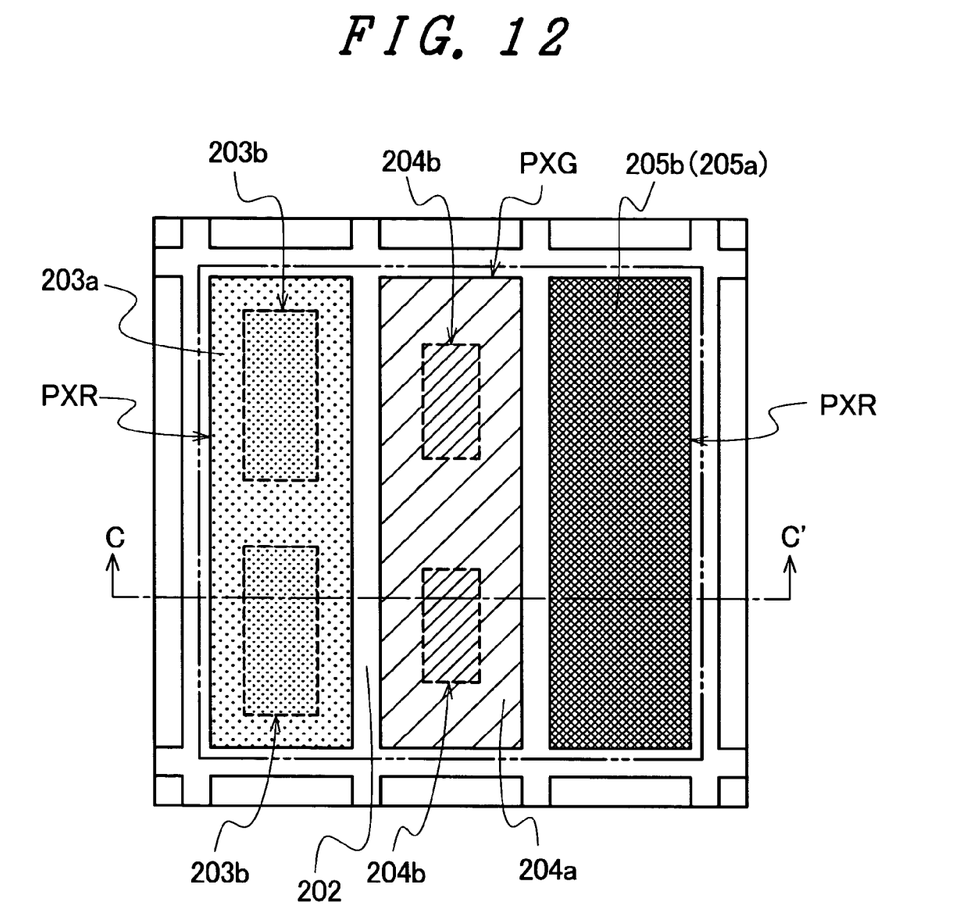
FIG. 12 is a schematic view for explaining an application example of this embodiment and also is a schematic plan view showing the constitution of one dot of the liquid crystal display panel.
Figure 13:
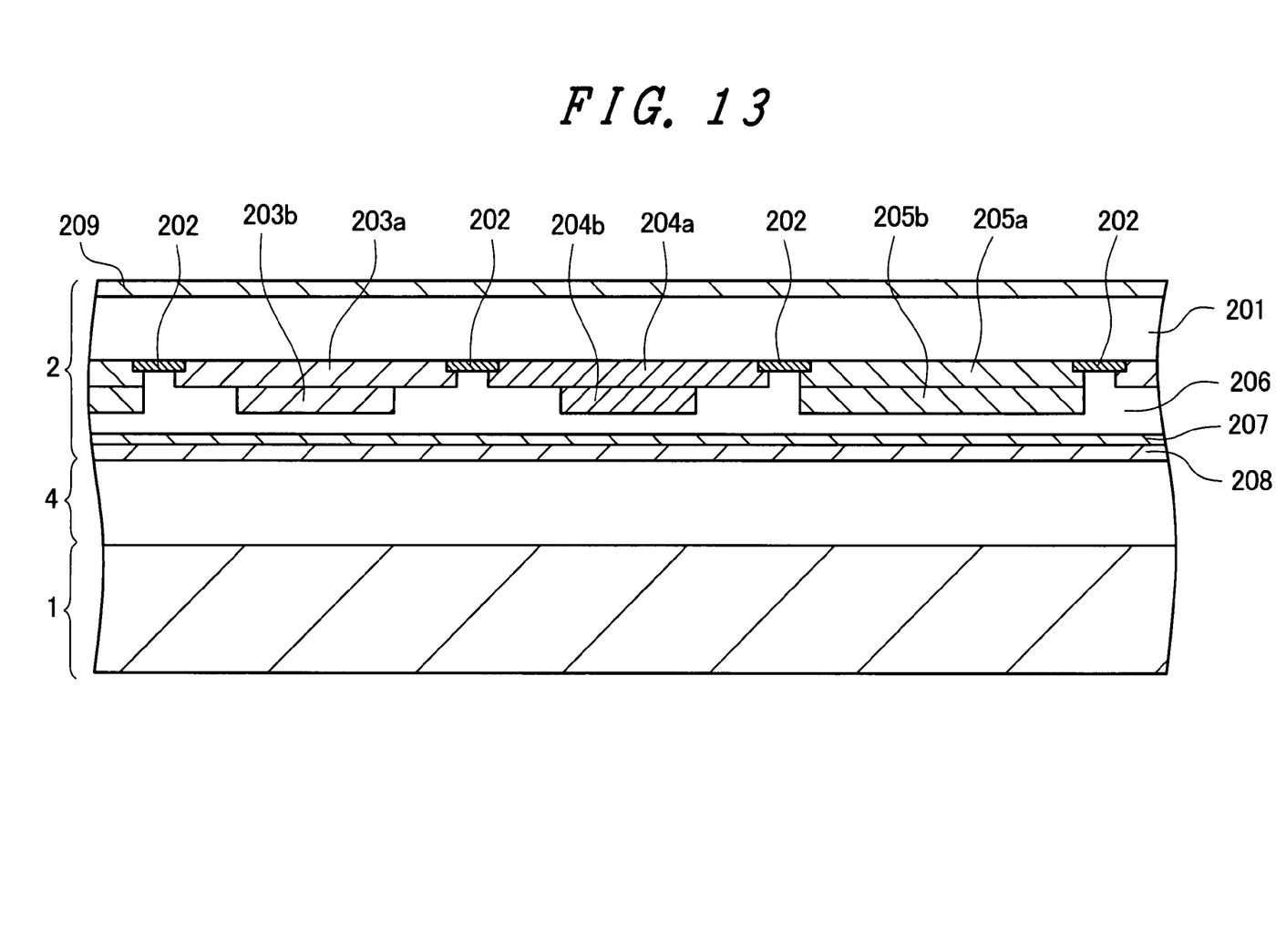
FIG. 13 is a schematic view for explaining an application example of this embodiment and also is a cross-sectional view taken along a line C-C' in FIG. 12.

FIG. 12 and FIG. 13 are schematic views for explaining an application example of this embodiment, wherein FIG. 12 is a schematic plan view showing the constitution of one dot of the liquid crystal display panel, and FIG. 13 is a cross-sectional view taken along a line C-C' in FIG. 12.

With respect to the liquid crystal display panel used in the color liquid crystal display device of this embodiment, in forming the color filter of each color, the two-layered filter layer formed of the first filter layer and the second filter layer is exposed and developed, wherein by changing the remaining area of the second filter layer on the first filter layer, the color tone of the each color filter is controlled. Here, it is not always necessary that the remaining areas of the second filter layers of the respective color filters are equal as shown in FIG. 3. That is, for example, as shown in FIG. 12 and FIG. 13, the remaining areas of the second filter layers of the respective color filters may differ from each other. In this manner, by changing remaining areas of the second filter layers of the respective color filters, it is possible to easily control the color temperature of white color which is obtained by synthesizing lights emitted from the above-mentioned R pixel PXR, G pixel PXG and B pixel PXB.

Next, one example of materials which are used for forming color filters of respective colors of the liquid crystal display panel according to this embodiment and advantageous effects obtained by the use of the materials are simply explained.

First of all, in forming the color filter (blue) of the B pixel, as a pigment which determines the color tone, for example, a pigment which is produced by mixing C.I. pigment blue and C.I. pigment violet at a rate of 9:1 is used. Further, as a binder resin, for example, copolymer of benzil methacrylate, methyl methacrylate and methacrylic acid can be used. Further, as a cross-linking agent, for example, dipentaerythritol hexa acrylate can be used. Further, in both of the first filter layer 205a and the second filter layer 205b, the pigment, the binder resin and the cross-linking agent are mixed at a weight ratio of 2:1:1, for example.

Further, as a photosensitive agent, IRGACURE 369 (made by Ciba Specialty Chemicals K. K.) can be used. As a sensitizer, for example, diethyl aminobenzophenone can be used. In the first filter layer 205a, 15% of the photosensitive agent and 8% of sensitizer are mixed with respect to a solid content (1 μm) of the pigment, the binder resin and the cross-linking agent, for example. Further, in the second filter layer 205b, 5% of the photosensitive agent and 0.5% of sensitizer are mixed with respect to a solid content (1 μm) of the pigment, the binder resin and the cross-linking agent, for example.

When the first filter layer 205a and the second filter layer 205b having such compositions are used, for example, the half-tone exposure region $L_h$ is exposed at 100 mJ/cm² and the full-tone exposure region $L_f$ is exposed at 200 mJ/cm². Then, when the development is performed, for example, when the filter layers are immersed in 0.2% TMAH (tetramethylammonium hydride) for 60 seconds and are washed with water, it is possible to allow the second filter layer 205b to remain only in the full-tone exposure region $L_f$.

Here, for example, three kinds of blue color filters which respectively have the remaining areas of the second filter layer 205b of 0%, 50% and 100% are formed by changing the area ratio between the half-tone exposure region $L_h$ and the full-tone exposure region $L_f$, for example. By comparing the respective color tones (chromaticity), a result shown in following Table 2 is obtained. Table 2 shows one example of the relationship between the remaining area and the chromaticity of the second color filter layer of the blue filter.

TABLE 2

| Remaining area of second CF layer | | 0% | 50% | 100% |
|---|---|---|---|---|
| chromaticity | x value | 0.14 | 0.14 | 0.14 |
| | y value | 0.19 | 0.15 | 0.10 |

In this manner, in case of the blue color filter, for example, when the remaining area of the second filter layer 205b is increased, the y value of chromaticity is decreased. Accordingly, by combining one first filter layer 205a and one second filter layer 205b, it is possible to form the blue color filters which differ in color tone.

Further, in forming the color filter (green) of the G pixel, as a pigment which determines the color tone, for example, a pigment which is produced by mixing C.I. pigment green and C.I. pigment yellow at a rate of 3:1 is used. Further, as the binder resin and the cross-linking agent, materials which are used in forming the above-mentioned blue color filter are used for example. Further, in both of the first filter layer 204a and the second filter layer 204b, the pigment, the binder resin and the cross-linking agent are mixed at a weight ratio of 3:1:1, for example.

Further, materials which are used as the photosensitive agent and the sensitizer and mixing ratios of these materials may be set equal to the corresponding materials and the mixing ratios used in forming the blue color filters.

When the first filter layer 204a and the second filter layer 204b having such compositions are used, for example, by exposing these layers such that the half-tone exposure region $L_h$ is exposed at 100 mJ/cm² and the full-tone exposure region $L_f$ is exposed at 200 mJ/cm², and, thereafter, by developing these layers, it is possible to allow the second filter layer 204b to remain only on the full-tone exposure region $L_f$.

Here, for example, three kinds of green color filters which respectively have the remaining areas of the second filter layer 204b of 0%, 50% and 100% are formed by changing the area ratio between the half-tone exposure region $L_h$ and the full-tone exposure region $L_f$, for example. By comparing the respective color tones (chromaticity), a result shown in following Table 3 is obtained. Table 3 shows one example of the relationship between the remaining area and the chromaticity of the second color filter layer of the green filter.

TABLE 3

| Remaining area of second CF layer | | 0% | 50% | 100% |
|---|---|---|---|---|
| chromaticity | x value | 0.33 | 0.31 | 0.28 |
| | y value | 0.53 | 0.55 | 0.58 |

In this manner, in case of the green color filter, when the remaining area of the second filter layer 204b is increased, the x value of chromaticity is decreased and, at the same time, the y value of chromaticity is increased. Accordingly, by combining one first filter layer 204a and one second filter layer 204b, it is possible to form the green color filters which differ in color tone.

Further, in forming the color filter (red) of the R pixel, as a pigment which determines the color tone, for example, C.I. pigment red is used. Further, as the binder resin and the cross-linking agent, materials which are used in forming the above-mentioned blue color filter are used, for example. Further, in both of the first filter layer 203a and the second filter layer 203b, the pigment, the binder resin and the cross-linking agent are mixed at a weight ratio of 2.5:1:1, for example.

Further, materials which are used as the photosensitive agent and the sensitizer and mixing ratios of these materials may be set equal to the corresponding materials and the mixing ratios used in forming the blue color filters.

When the first filter layer 203a and the second filter layer 203b having such compositions are used, for example, by exposing these layers such that the half-tone exposure region $L_h$ is exposed at 100 mJ/cm² and the full-tone exposure region $L_f$ is exposed at 200 mJ/cm², and, thereafter, by developing these layers, it is possible to allow the second filter layer 203b to remain only on the full-tone exposure region $L_f$.

Here, for example, three kinds of red color filters which respectively have the remaining areas of the second filter layer 203b of 0%, 50% and 100% are formed by changing the area ratio between the half-tone exposure region $L_h$ and the full-tone exposure region $L_f$, for example. By comparing the respective color tones (chromaticity), a result shown in following Table 4 is obtained. Table 4 shows one example of the relationship between the remaining area and the chromaticity of the second color filter layer of the red filter.

TABLE 4

| Remaining area of second CF layer | | 0% | 50% | 100% |
|---|---|---|---|---|
| chromaticity | x value | 0.53 | 0.59 | 0.64 |
| | y value | 0.37 | 0.35 | 0.33 |

In this manner, in case of the red color filter, for example, when the remaining area of the second filter layer 203b is increased, the x value of chromaticity is increased and, at the same time, they value of chromaticity is decreased. Accordingly, by combining one first filter layer 203a and one second filter layer 203b, it is possible to form the red color filters which differ in color tone.

As has been explained heretofore, according to the color liquid crystal display device of this embodiment, in forming the color filters of respective colors of the liquid crystal display panel (color filter substrate 2), by stacking the first filter layer and the second filter layer and by changing the remaining area of the second filter layer, the color tones of the respective color filters can be easily changed and hence, it is possible to easily control the color temperature of white and color reproducibility of respective colors.

Further, in forming each color filter, by directly exposing the first filter layer and the second filter layer and by controlling the remaining area of the second filter layer 203b, it is possible to efficiently form each color filter in a short time. Here, by using the direct drawing exposure machine in exposing respective filter layers, it is possible to easily change the combination of the remaining area of the second filter layer at the time of forming the respective color filters. Further, it is possible to change color tone by changing the remaining area of the second filter layer and hence, due to the combination of one first filter layer and one second filter layer, it is possible to form the color filter having the arbitrary color tone. Accordingly, it is possible to easily manufacture the liquid crystal display panels which differ in the color temperature of white and the color reproducibility of respective colors.

Further, in the display device of this embodiment, it is possible to finely adjust the color tone of each color filter based on the remaining area of the second filter layer. Accordingly, for example, it is possible to obviate the color irregularities which are generated due to a factor other than the color tone of the color filter by adjusting the remaining area of the second filter layer.

Further, in exposing the first filter layer and the second filter layer, with the use of the direct drawing exposure machine, it is possible to finely control the remaining area of the second filter layer, that is, the half-tone exposure region $L_h$ and the full-tone exposure region $L_f$ and hence, it is possible to increase the degree of freedom in determining the color tones of respective color filters.

Further, in this embodiment, the explanation has been made assuming that the first filter layer and the second filter layer have the same color tone. However, the present invention is not limited to such a case and filter layers which differ in color tone may be stacked. In this case, by using the filter layer having the deeper color tone as the second filter layer, it is possible to obtain the color tone having a wider range compared to the case in which the color tone is set equal.

Further, in this embodiment, the case in which the color tone of each color filter is controlled using the two-layered filter having the first filter layer, and the second filter layer is taken as an example. However, the present invention is not limited to such a case and three or more filter layers are stacked to form the color filter and the color filter layers may be controlled.

Further, in forming the first filter layer and the second filter layer on the glass substrate 201, by performing the transfer operation using the transfer film shown in FIG. 5, for example, it is possible to form the first filter layer and the second filter layer in one step.

Further, it is needless to say that the composition of the materials used for forming the first filter layer and the second filter layer and the combination of the developers are not limited to the above-mentioned examples and various combinations can be suitably selected.

Figure 14:
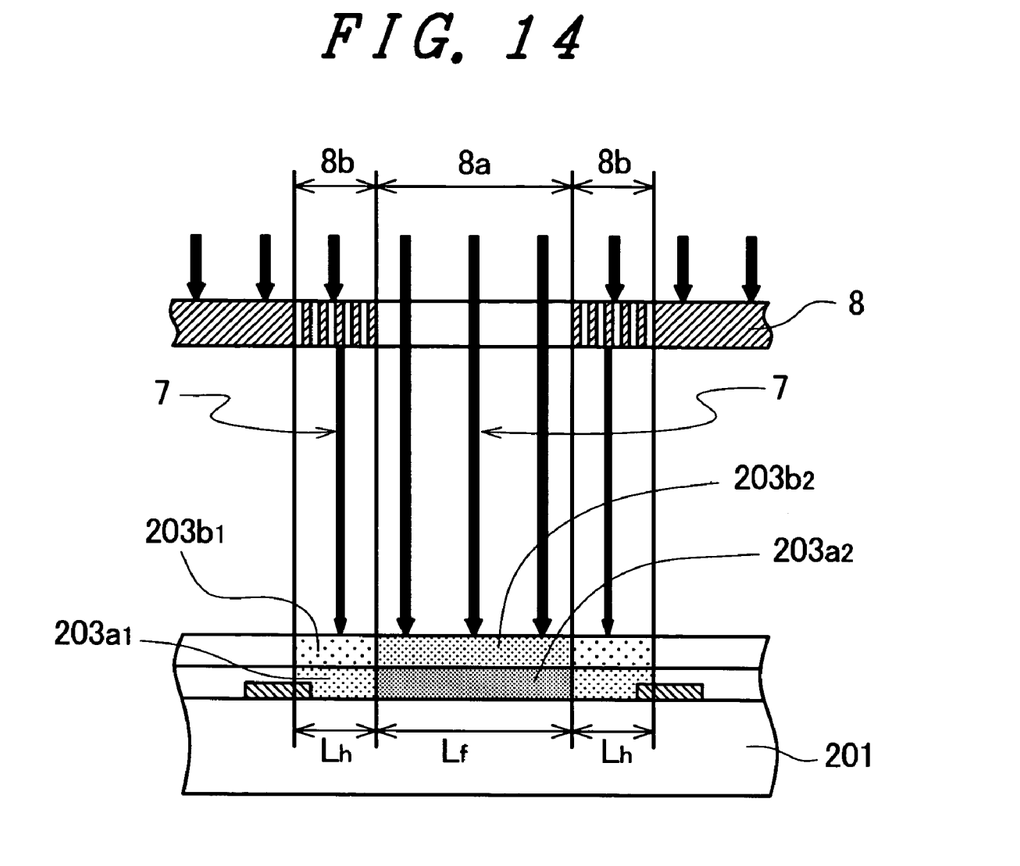
FIG. 14 is a schematic view for explaining an application example of the above-mentioned embodiment.

FIG. 14 is a schematic view for explaining an application example of the above-mentioned embodiment.

In the above-mentioned embodiment, for example, using the direct drawing exposure machine provided with DMD mirrors which have the constitution shown in FIG. 8 and FIG. 9, the half-tone exposure region $L_h$ and the full-tone exposure region $L_f$ are controlled. However, informing the color filters of the present invention, the formation of such regions is not limited to the exposure using such a direct drawing exposure machine and it is possible to form the color filters by the exposure which uses a conventional mask.

In forming the color filters of the present invention by the exposure which uses the conventional mask, for example, as shown in FIG. 14, an exposure mask 8 which includes a completely opened opening portion 8a in the full-tone exposure region $L_f$ and a slit portion 8b in which slits having a size smaller than the exposure resolution are formed in the half-tone exposure region $L_h$ around the full-tone exposure region $L_f$ may be used.

Here, out of light which is radiated from a light source, a quantity of light which is radiated to a first filter layer 203a and a second filter layer 203b through the slit portions 8b formed in the exposure mask 8 becomes smaller than a quantity of light which is radiated to the first filter layer 203a and the second filter layer 203b through the opening portion 8a formed in the exposure mask 8. Accordingly, by controlling the area of the slit portion 8B, a curing action of an exposure region $203a_1$ of the first filter layer 203a progresses until the exposure region $203a_1$ becomes insoluble to a developer, while a curing action of an exposure region $203b_1$ of the second filter layer 203b progresses until the exposure region $203b_1$ is dissolved to a developer.

Further, in performing the exposure using the exposure mask, the exposure mask is not limited to the mask shown in FIG. 14 and it may be possible to perform the primary exposure and the secondary exposure using two exposure masks which differ in a light blocking area.

Further, the above-mentioned embodiment exemplifies the method in which, for example, as shown in FIG. 5, the first filter layer 203a and the second filter layer 203b are transferred to the glass substrate 201 using the transfer film in which the first filter layer 203a and the second filter layer 203b are preliminarily stacked. However, the first filter layer 203a and the second filter layer 203b may be formed by other forming method. As other method for forming the first filter layer 203a and the second filter layer 203b, for example, there exists a method which uses two transfer films consisting of the transfer film which transfers the first filter layer 203a and the transfer film which transfers the second filter layer 203b, wherein the first filter layer 203a and the second filter layer 203b are sequentially laminated or stacked. Besides these methods, for example, it may be possible to transfer (laminate) the second filter layer 203b after coating the first filter layer 203a, or the second filter layer 203b may be coated after transferring (laminating) the first filter layer 203a.

Although the present invention has been specifically explained in conjunction with the embodiments described above, it is needless to say that the present invention is not limited to the embodiments and various modifications are conceivable without departing from the gist of the present invention.

For example, in the above-mentioned embodiment, the color liquid crystal display device is exemplified as one example of the display device. However, it is needless to say that the present invention is not limited to the color liquid crystal display device and is applicable to any display device provided that the display device color filters having the constitution substantially equal to the constitution of the color filter substrate 2 explained in conjunction with the above-mentioned embodiment. As the display device to which the present invention is applicable except for the color liquid crystal display device, for example, a CRT (Cathode Ray Tube) display, a PDP (Plasma Display Panel), a FED (Field Emission Display) or the like is named.

What is claimed is:

1. A display device including a display panel on which a plurality of color filters different in color from each other are arranged for each pixel;
   wherein the display panel includes a color filter substrate and another substrate which is spaced from and faces the color filter substrate;
   wherein at least the color filter of one color is formed of a plurality of color filter layers including a first color filter layer and a second color filter layer stacked upon one another on a transparent substrate member of the color filter substrate;
   wherein an area of the first color filter layer of the stacked color filter layers which is positioned close to the transparent substrate member is set to be larger than an area of the second color filter layer which is stacked on the first color filter layer at a position more remote from the transparent substrate member than the first color filter layer;
   wherein a distance between the color filter substrate and the another substrate is constant at least in an area of the another substrate which faces both of the areas of the first and the second color filter layers of the stacked color filter layers; and
   wherein the second color filter layer is arranged on a plurality of regions of the first color filter layer in an island array.

2. A display device according to claim 1, wherein the plurality of stacked color filter layers have the same color tone.

3. A display device according to claim 1, wherein at least one color filter layer out of the plurality of the stacked color filter layers differs from other color filter layers in color tones.

4. A display device according to claim 1, wherein the color filter layer which is remotest from the transparent substrate out of the plurality of stacked color filter layers has color thereof deeper than colors of other color filter layers.

5. A display device according to claim 1, wherein the display device is a liquid crystal display device and a liquid crystal is disposed between the color filter substrate and the another substrate.

6. A display device according to claim 1, wherein the another substrate includes another transparent substrate member.

7. A display device according to claim 1, wherein a plurality of stacked color filter layers of different color are provided on the transparent substrate member of the color filter substrate, and the distance between the color filter substrate and the another substrate is constant at least in the areas of the another substrate which face both of the areas of the first and second color filter layers of the stacked color filter layers of the different colors.

* * * * *